(12) United States Patent
Kaplan et al.

(10) Patent No.: US 7,464,117 B2
(45) Date of Patent: Dec. 9, 2008

(54) USING DIRECTORY HISTORICAL DATA TO FACILITATE AUTOMATED FILE UPDATES

(75) Inventors: Keith Stuart Kaplan, Bothell, WA (US); George Floyd Goley, IV, Woodinville, WA (US); Gunnar Mein, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 11/335,971

(22) Filed: Jan. 20, 2006

(65) Prior Publication Data

US 2007/0185919 A1    Aug. 9, 2007

(51) Int. Cl.
*G06F 12/00* (2006.01)
*G06F 17/30* (2006.01)

(52) U.S. Cl. ....................... 707/201; 707/204
(58) Field of Classification Search ............... None
See application file for complete search history.

(56) References Cited

U.S. PATENT DOCUMENTS

| | | | | |
|---|---|---|---|---|
| 5,706,509 A | * | 1/1998 | Man-Hak Tso | 707/201 |
| 5,909,689 A | * | 6/1999 | Van Ryzin | 707/203 |
| 6,044,381 A | * | 3/2000 | Boothby et al. | 707/201 |
| 6,141,664 A | * | 10/2000 | Boothby | 707/201 |
| 6,295,541 B1 | * | 9/2001 | Bodnar et al. | 707/203 |
| 6,449,622 B1 | * | 9/2002 | LaRue et al. | 707/201 |
| 6,477,543 B1 | * | 11/2002 | Huang et al. | 707/200 |
| 6,704,755 B2 | * | 3/2004 | Midgley et al. | 707/204 |
| 2001/0029507 A1 | * | 10/2001 | Nojima | 707/102 |

OTHER PUBLICATIONS

Moby Disk and DarkOx, Database File System: Comments, HTML, Sep. 6, 2004, Slashdot.org, Available: http://linux.slashdot.org/article.pl?sid=04/09/06/1235236.*

* cited by examiner

*Primary Examiner*—Pierre M. Vital
*Assistant Examiner*—Jason Liao
(74) *Attorney, Agent, or Firm*—Workman Nydegger

(57) ABSTRACT

The present invention extends to methods, systems, and computer program products for using directory historical data to facilitate automated file updates. A pair of directories is updated, for example, synchronized, with one another. Directory historical data, such as, for example, previous contents of the directories, is utilized to determine what file operations are to be performed during an update. User-selectable update modes can also be used to further configure what file operations are performed during an update.

21 Claims, 4 Drawing Sheets

USING DIRECTORY HISTORICAL DATA TO FACILITATE AUTOMATED FILE UPDATES

CROSS-REFERENCE TO RELATED APPLICATIONS

Not Applicable

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

Often, a computer user has multiple computer systems that they use to perform various computing tasks at different times. For example, a sales person may have a laptop computer they use when traveling and a desktop computer they use when in the office. Each of the computer systems can have at least some of the same applications installed so that the sales person can work in the office as well as when traveling. Since the sales person can perform work both on the desktop computer and the laptop computer, the data stored at the laptop and desktop can diverge over time. For example, if the sales person drafts a document on the desktop computer, the drafted document is only stored at the desktop computer. Similarly, if the sales person adds contact information for a customer to the laptop computer system, the contact information is only stored at the laptop computer. As more data is added to one computer and not the other, stored data at each of the computer systems can become quite diverse.

Manual transfer of data from one computer system to another can be useful to mitigate data divergence. However, in some environments large amounts of data are frequently modified at each of a pair of computer systems that are to be kept up to date with one another. At least in these environments, it can be difficult, if not impossible, for a computer user to recall and/or determine how data should be copied between the computer systems to keep the computer systems current with one another.

As a result some mechanisms have been developed to "synchronize" directories at different computer systems and to synchronize multiple directories at the same computer system with one another. For example, some synchronization mechanisms allow a desktop and laptop to be directly connected to one another for the purpose of automatically updating directories at the desktop and laptop with one another. Other synchronization mechanisms allow similar directory updates over a network, such as, for example, a Local Area Network ("LAN") or even the Internet. Accordingly, these synchronization mechanisms can provide automated assistance to a user that is attempting to keep the contents of directories at different computer systems up to date with one another.

For example, some synchronization mechanisms include software that compares the current contents of directories at different computer systems to one another to attempt to identify differences in the contents of the directories. Based on results of comparing the current contents, the software can automatically perform one or more file operations to update directories. That is, existing synchronization mechanisms can copy new and updated files between directories.

Thus, if a computer user creates a new file at a laptop computer and then connects the laptop computer to a desktop computer, the software may be able to determine that the file on the laptop computer is new and automatically replicate the file at the desktop computer system. For example, the software can use a copy operation to copy the new file to the desktop computer. The software can also attempt to replicate changes at the desktop computer to the laptop computer.

However, in at least some circumstances, current synchronization mechanisms have no way to automatically determine what a user actually did to cause the current contents of directories at different computer systems to differ. For example, upon comparing the current contents of directories, software may determine that a file exists at a laptop computer but not at a desktop computer. However, the software may have no way to know if the user added the file to the laptop computer or if the file was previously present at both the laptop computer and the desktop computer and the user deleted or renamed the file at the desktop computer. As a result, the software may be unable to determine if the file is to be deleted from the laptop computer or copied from the laptop computer to the desktop computer. Additionally, if the same file exists on both the laptop and desktop computers, but with different names, existing software is unable to determine which filename is more appropriate.

Further, existing synchronization mechanisms provide little, if any, configuration options to configure how a pair of directories is to be updated. For example, typical synchronization mechanisms include hard coded rules for copying new and updated files between directories in both directions. Thus, these types of copying and updating can not be adjusted to operate differently on a per directory or per operation basis. For example, there is typically no way to configure an existing synchronization mechanism to copy new files between directories but not to copy updated files between directories. Accordingly, a computer user desiring to synchronize directories is relegated to a configuration based on a single set of hard coded rules even though a different configuration may be more appropriate.

Typical synchronization mechanisms are also limited in the types of file operations they can perform. For example, typical synchronization mechanisms lack any ability to appropriately replicate file modifications, file renames, and file deletions between directories.

BRIEF SUMMARY

The present invention extends to methods, systems, and computer program for using directory historical data to facilitate automated file updates. In some embodiments, an indication that a first directory and a second directory are to be synchronized is received. Directory historical data for the first and second directories is referred to. The directory historical data indicates at least the previous contents of the first and second directories when the first and second directories were previously synchronized.

The directory historical data is compared to at least the current contents of the first and second directories to identify differences between the previous contents of the first and second directories and the current contents of the first and second directories. The differences indicate how the first and second directories are to be synchronized. The identified differences are utilized to synchronize the first and second directories to better represent what the intended contents of the first and second directories are to be after synchronization.

In other embodiments, an indication that a first directory and a second directory are to be updated in accordance with a user-selected directory update mode is received. A first saved snapshot of the first directory, saved prior to receiving the indication that the first and second directories are to be updated, is referred to. The first saved snapshot of the first directory stores at least a list of files included in the first directory after a previous update of the first and second directories. A second saved snapshot of the second directory, saved prior to receiving the indication that the first and second directories are to be updated, is referred to. The second saved snapshot of the second directory stores at least a list of files included in the second directory after a previous update of the first and second directories.

The current contents of the first directory are compared to the first snapshot. The current contents of the second directory are compared to the second snapshot. The contents of the first and second directories are categorized into one or more categories based on the results of the comparisons. Appropriate file operations to perform on each of the categorized files are identified based on the user-selected update mode. The identified file system operations are performed on the categorized files to update the first and second directories in accordance with the user-selected update mode.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
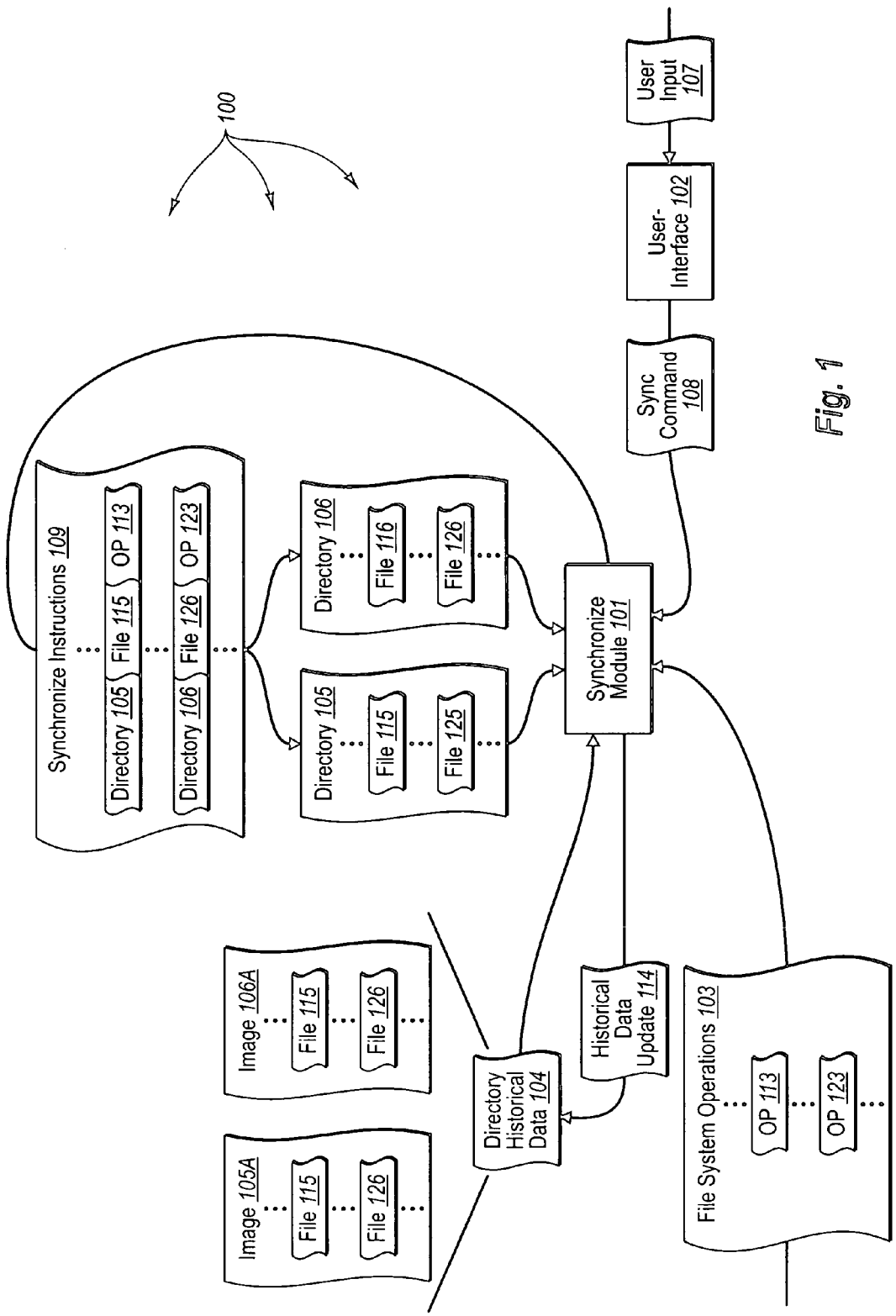
FIG. 1 illustrates an example computer architecture that facilitates synchronizing files.

The present invention extends to methods, systems, and computer program products for using directory historical data to facilitate automated file updates. In some embodiments, an indication that a first directory and a second directory are to be synchronized is received. Directory historical data for the first and second directories is referred to. The directory historical data indicates at least the previous contents of the first and second directories when the first and second directories were previously synchronized.

The directory historical data is compared to at least the current contents of the first and second directories to identify differences between the previous contents of the first and second directories and the current contents of the first and second directories. The differences indicate how the first and second directories are to be synchronized. For example, the differences can indicate how directories have changed since a previous synchronization operation. The identified differences are utilized to synchronize the first and second directories to better represent what the intended contents of the first and second directories are to be after synchronization. For example, the changes can be analyzed and, along with a user selected update mode, can indicate how directories are to be synchronized.

In other embodiments, an indication that a first directory and a second directory are to be updated in accordance with a user-selected directory update mode is received. A first saved snapshot of the first directory, saved prior to receiving the indication that the first and second directories are to be updated, is referred to. The first saved snapshot of the first directory stores at least a list of files included in the first directory after a previous update of the first and second directories. A second saved snapshot of the second directory, saved prior to receiving the indication that the first and second directories are to be updated, is referred to. The second saved snapshot of the second directory stores at least a list of files included in the second directory after a previous update of the first and second directories.

The current contents of the first directory are compared to the first snapshot. The current contents of the second directory are compared to the second snapshot. The contents of the first and second directories are categorized into one or more categories based on the results of the comparisons. Appropriate file operations to perform on each of the categorized files are identified based on the user-selected update mode. The identified file system operations are performed on the categorized files to update the first and second directories in accordance with the user-selected update mode.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates synchorizing directories. Depicted in computer architecture 100 are various components including synchronize module 101 and user-interface 102. Each of the various components can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, synchronize module 101 is configured to use directory historical data to facilitate more accurate directory synchronization of a pair of directories. Synchronize module 101 can access directory historical data as well as the contents of directories that are to be synchronized. Directory historical data can indicate at least the resulting contents of the pair of directories after previous synchronization of the pair of directories.

File system operations 103 includes available file system operations, such as, for example, op 113 and op 123 that, synchronize module 101 can use to facilitate synchronization of a pair of directories. A series of three vertical periods (a vertical ellipsis) represents that other file system operations may also be available. For example, a file system can include file system operations for creating files, deleting files, renaming files, copying files, moving files, etc.

User-interface 102 is configured to at least receive user-input for configuring synchronize module 101, for receiving user-input initiating synchronization commands, and for receiving and presenting output from synchronize module 101.

Directories 105 and 106 can be directories at the same or at different computer systems. For example, directory 105 may be at a laptop computer system and directory 106 may be at a desktop computer system. Each of the directories 105 and 106 can include one or more files. For example, directory 105 includes at least files 115 and 125. Likewise, directory 106 includes at least files 116 and 126. A vertical ellipsis included in directories 105 and 106 represents that other additional files can be included before, between, and after the expressly depicted files.

Historical directory data 104 can indicate at least the contents of directory 105 (e.g., a directory at a laptop computer system) and directory 106 (e.g., a directory at a desktop computer system) when directories 105 and 106 were previously synchronized.

Figure 2:
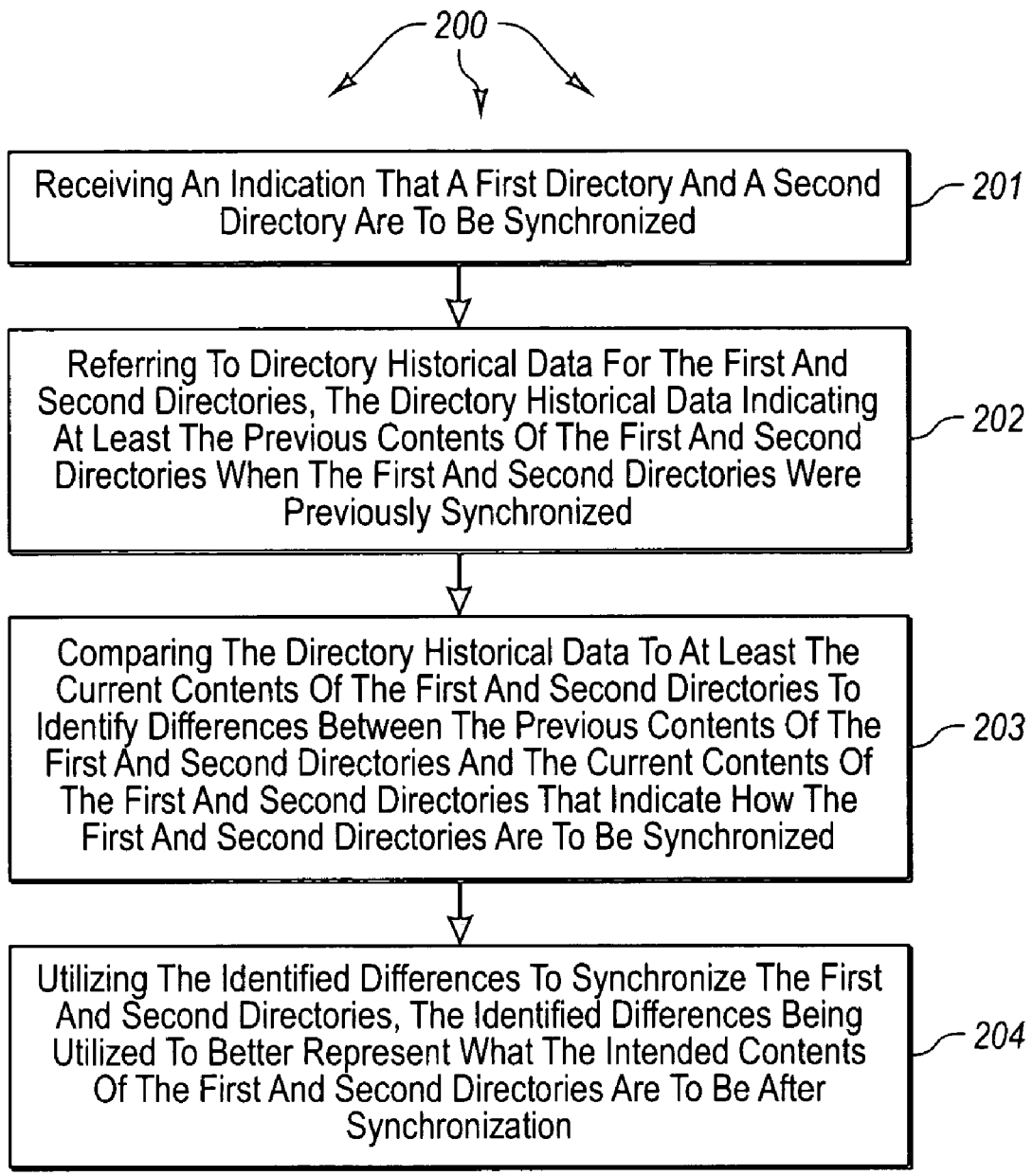
FIG. 2 illustrates a flow chart of an example method for synchronizing files.

FIG. 2 illustrates a flow chart of an example method 200 for synchronizing directories. The method 200 will be described with respect to the components and data in computer architecture 100.

Method 200 includes an act of receiving an indication that a first directory and a second directory are to be synchronized (act 201). For example, synchronize module 101 can receive sync command 108 from user-interface 102. User-interface 102 can send sync command 108 in response to receiving user-input 107 indicating a user command to synchronize a pair of directories. An indication that directories are to be synchronized can be received in user input (e.g., user input 107). User input can include an indication that synchronization is to be performed essentially immediately in response to the user input. For example, user input 107 can include an indication that directories 105 and 106 are to be synchronized essentially immediately in response to receiving user input 107. Thus, in response to user input 107, user-interface 102 can send sync command 108 to synchronize module 101.

Alternately, user input can include scheduling information for scheduling synchronization at a specified time. For example, user input 107 can include scheduling information for scheduling synchronization at midnight every night. User interface 102 can forward scheduling information on to a scheduling module that maintains schedules for directory synchronization. When midnight occurs, the scheduling module can send sync command 108 to synchronize module 101.

Method 200 includes an act referring to directory historical data for the first and second directories (act 202). The saved historical data indicates at least the contents of the first and second directories when the first and second directories were previously synchronized. For example, synchronize module 101 can refer to directory historical data 104. Historical directory data 104 can indicate at least the previous contents of directory 105 and directory 106 when directories 105 and 106 were previously synchronized. For example, historical directory data 104 can include image 105A indicating the previous contents of directory 105 and image 106A indicating the previous contents of directory 106. Although images 105A and 106A appear to indicate identical contents at least some files can differ.

Method 200 includes an act of comparing the directory historical data to at least the current contents of the first and second directories to identify differences between the previous contents of the first and second directories and the current contents of the first and second directories that indicate how the first and second directories are to be synchronized (act 203). For example, synchronize module 101 can compare image 105A to the current contents of directory 105 and can compare image 106A to the current contents of directory 106. From the comparison, synchronize module 101 can identify differences between the previous contents of directories 105 and 106 and the current contents of directories 105 and 106 that indicate how directories 105 and 106 are to be synchronized. Based at least in part on the identified differences, synchronize module 101 can synchronize directories 105 and 106 with one another.

Method 200 includes an act of utilizing the identified differences to synchronize the first and second directories (act 204). The identified differences are utilized to better represent what the intended contents of the first and second directories are to be after synchronization. For example, synchronize module 101 can utilize identified differences to formulate synchronize instructions 109. File operations in entries of synchronize instructions 109 can be performed to manipulate the contents of directories 105 and 106 as intended (e.g., by a user). Each entry in file synchronization instructions 109 identifies a directory and file and indicates the file operation that is to be performed on the file in order to synchronize directories 105 and 106 with one another. For example, one entry identifies that op 113 is to be performed on file 115 in directory 105. Similarly, another entry identifies that op 123 is to be performed on file 126 in directory 106. A vertical ellipsis represents that other entries can be included before, between, and after the expressly depicted entries in synchronize instructions 109.

After synchronization, synchronize module 101 can access the synchronized contents of directories 105 and 106. Based on the synchronized contents, synchronize module 101 can update directory historical data to indicate the synchronized contents of directories 105 and 106. For example, synchronization module 101 can supplement directory historic data 104 with historical data update 114. Historical data update 114 can overwrite (or update) image 105A and 106A to indicate the synchronized contents of directories 105 and 106.

Embodiments of the present invention can be used to better implement the intent of a user during synchronization. For example, as indicated in image 105A and 106A, it may be that both directory 105 and directory 106 contained file 115 after a previous synchronization. Images 105A and 106A may have been updated by synchronization module 101 after the previous synchronization.

Subsequently, a user may delete file 115 from directory 106. During synchronization after file 115 is deleted from directory 106, synchronize module 101 can compare the current contents of directories 105 and 106 to the previous contents of directories 105 and 106 (stored in images 105A and 106A). Synchronize module 101 can identify the difference between the current and previous contents of directories 105 and 106. That is, synchronize module 101 can identify that file 115 was previously in the contents of both directory 105 and 106 and that file 115 is currently in the contents directory 105 but not currently in the contents of directory 106. This identified difference in the previous and current contents of directories 105 and 106 indicates to synchronization module 101 that file 115 was deleted from directory 106. Accordingly, during synchronizations synchronize module 101 can formulate synchronize instructions to also delete file 115 from directory 105 (e.g., using a file delete operation).

Alternately, a user may add file 116 to directory 106. During synchronization after file 116 is added to directory 106, synchronize module 101 can compare the current contents of directories 105 and 106 to the previous contents of directories 105 and 106 (e.g., stored in images 105A and 106A). Synchronize module 101 can identify the difference between the current and previous contents of directories 105 and 106. That is, synchronize module 101 can identify that file 116 was previously not in the contents of directory 105 nor in the contents of directory 106 and that file 106 is currently not in the contents of directory 105 but is currently in the contents of directory 106. This identified difference in the previous and current contents of directories 105 and 106 indicates to synchronization module 101 that file 116 was added to directory 106. Accordingly, during synchronization synchronize module 101 can formulate synchronize instructions to also add 116 to directory 105 (e.g., using a file copy operation) from directory 106.

Alternately, a user may rename file 126 to file 125 in directory 105. During synchronization after file 126 is renamed to file 125, synchronize module 101 can compare the current contents of directories 105 and 106 to the previous contents of directories 105 and 106 (stored in images 105A and 106A). Synchronize module 101 can identify the difference between the current and previous contents of directories 105 and 106. That is, synchronize module 101 can identify that file 125 was previously not in the contents of directory 105 nor in the contents of directory 106 and that file 125 is currently in the contents of directory 105 but is currently not in the contents of directory 105.

Synchronization module 101 can further determine that, except for file name, the characteristics of files 125 and 126 are very similar (or even identical). Synchronization module 101 can make such a determination based on real-time analysis of files 125 and 126 and/or based on other file characteristics stored in images 105A and 106A. This identified difference in the previous and current contents of directories 105 and 106 and further determination of file similarity, indicates to synchronization module 101 that file 126 was renamed to file 125 in directory 105. Accordingly, during synchronization synchronize module 101 can formulate synchronize instructions to rename file 126 to file 125 in directory 106 (e.g., using a file rename operation).

Figure 3:
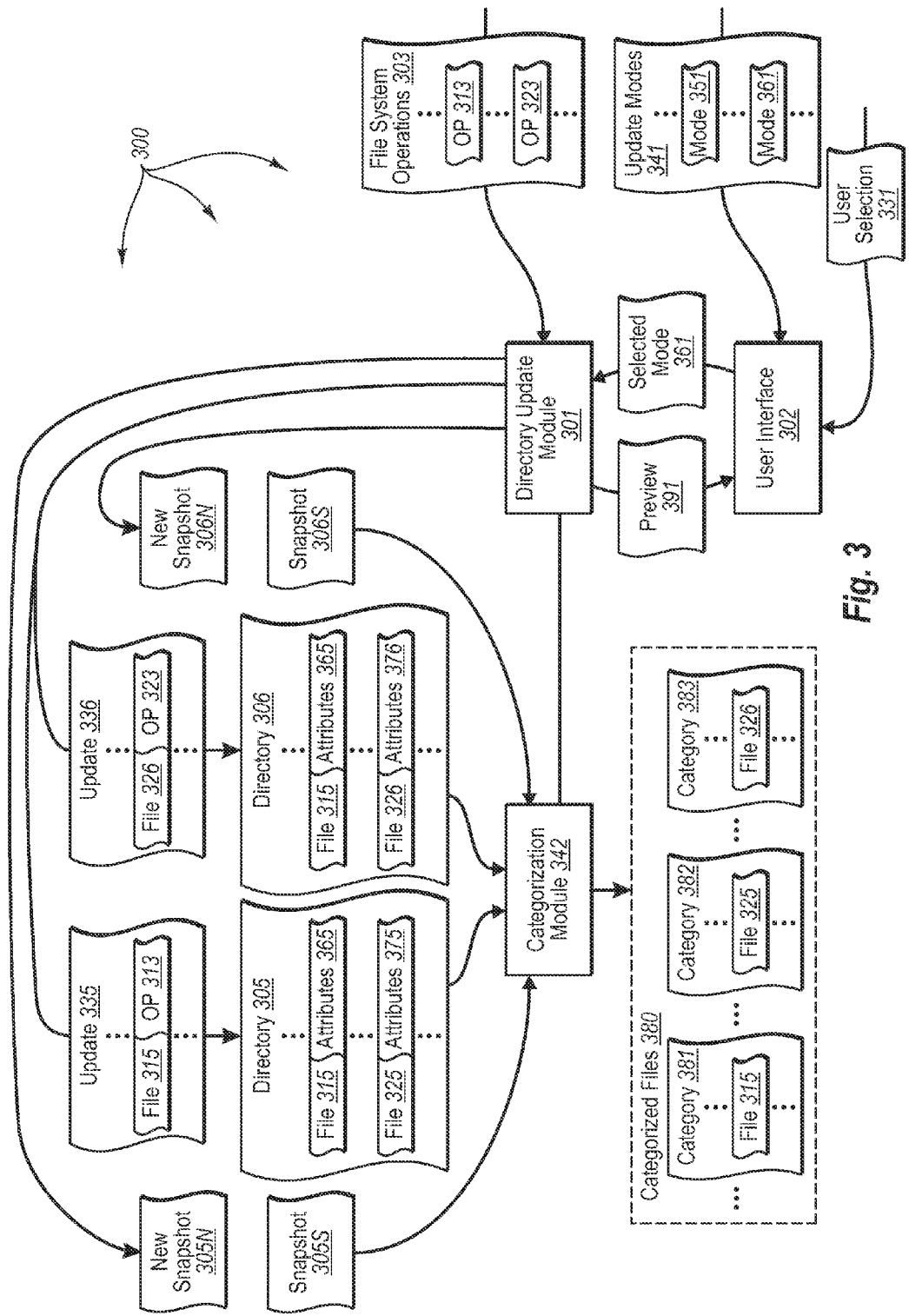
FIG. 3 illustrates an example computer architecture that facilitates automated file updates.

FIG. 3 illustrates an example computer architecture 300 that facilitates automated directory updates. Computer architecture 300 includes directory update module 301, user interface 302, categorization module 342, and file system operations 303.

Categorization module 342 is configured to access current directory contents and snapshots of previous directory contents and is configured to categorize files from the directories into one of a plurality of different categories. A snapshot can include a list of files from a directory. For each file, a snapshot can also include information about the file (e.g., file attributes), such as, for example, size, creation date/time, and a hash (e.g., SHA-1 hash) of the file's contents. A wide variety of different categories are possible. Some example categories include: existence of the file in one directory but not another, existence of the file in a pair of directories with a newer version of the file in one directory or another, existence of a file in a pair of directories where both files are identical, existence of the file in one snapshot but not another, existence of the file in a pair of snapshots with a newer version of the file in one snapshot or another, existence of a file in a pair of snapshots where both files are identical, etc. Other example categories can include various combinations of existence, file contents, and file versions, between a directory and a snapshot and vice versa.

Directory update module 301 is configured to accept a categorized list of files and a user-selected update mode and appropriately utilize available file system operations to update a pair of directories based on the file categories and user-selected update mode. Directory update module 301 is also configured to update directory snapshots after an update occurs.

File system operations 303 includes available file system operations, such as, for example, op 313 and op 323 that, directory update module 301 can use to facilitate updating of a pair of directories. A series of two vertical periods (a vertical ellipsis) represents that other file system operations may also be available. For example, a file system can include file system operations for creating files, deleting files, renaming files, copying files, moving files, etc.

User interface 302 is configured to at least present a list of available update modes and receive a user selection selecting one of the available update modes. For example, user interface 302 can present update modes 341, including mode 351 and mode 361. A vertical ellipsis included update modes 341 represents that other additional update modes can be included before, between, and after the expressly depicted update modes. An update mode can instruct directory update module as to how a pair of directories are to be updated. Some example update modes include:

Synchronize: New and updated files are copied between both directories (e.g., 305 and 306) in a pair of directories. File renames and deletes are repeated at both directories in the pair of directories.

Echo: New and updated files are copied from one directory (e.g., 305) in a pair of directories (e.g., 305 and 306) to the other directory (e.g., 306) in the pair of directories. File renames and deletes at the one directory (305) are repeated at the other directory (306).

Subscribe: New and updated files are copied from one directory (e.g., 305) in a pair of directories (e.g., 305 and 306) to the other directory (e.g., 306) if the file name already exists in the other directory (306).

Contribute: New and updated files are copied from one directory (e.g., 305) in a pair of directories (e.g., 305 and 306) to the other directory (e.g., 306) in the pair of directories. File renames at the one directory (305) are repeated at the other directory (306). File deletions are not repeated.

Combine: New and updated files are copied between both directories (e.g., 305 and 306) in a pair of directories. File renames and deletes are not repeated at either of the directories (305 or 306) in the pair of directories.

Directories 305 and 306 can be directories at the same or at different computer systems. For example, directory 305 may be at a laptop computer system and directory 306 may be at a desktop computer system. Each of the directories 305 and 306 can include one or more files and one or more subdirectories, each of which can also contain one or more files and one or more subdirectories. For example, directory 305 includes at least files 315 and 325. Likewise, directory 306 includes at least files 315 and 326. A vertical ellipsis included in directories 305 and 306 represents that other additional files can be included before, between, and after the expressly depicted files.

Figure 4:
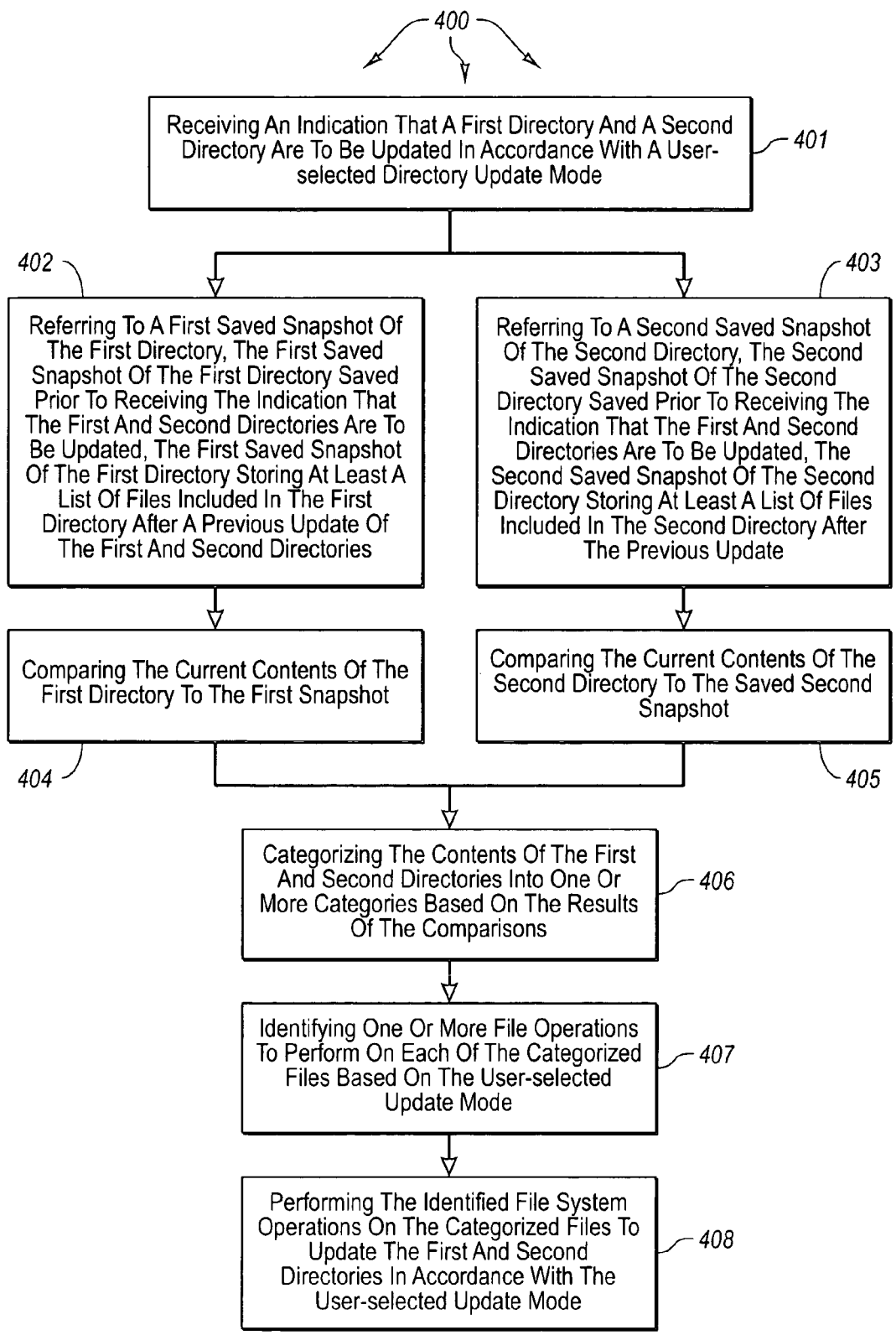
FIG. 4 illustrates a flow chart of a method for automatically updating files.

FIG. 4 illustrates a flow chart of a method 400 for automatically updating directories. Method 400 will be described with respect to the components and data in computer architecture 300.

Method 400 can include an act of receiving an indication that a first directory and a second directory are to be updated in accordance with a user-selected directory update mode (act 401). For example, directory update module 301 can receive selected mode 361 from user interface 302. Reception of selected mode 361 indicates to directory update module 301 that directories 305 and 306 are to be updated in accordance with selected mode 361.

Subsequent to presenting a list of update modes included in update modes 341, user interface 302 can receive user-selection 331 selected mode 361 as the selected update mode. User interface 302 can then send selected mode 361 to directory update module 301.

Method 400 includes an act of referring to a first saved snapshot of the first directory (act 402). The first saved snapshot of the first directory having been saved prior to receiving the indication that the first and second directories are to be updated. The first saved snapshot of the first directory storing at least a list of files included in the first directory after a previous update of the first and second directories. For example, categorization module 342 can access snapshot 306S. Snapshot 306S can be a snapshot of directory 306 (e.g., directory historical data) that was saved prior to receiving selected mode 361. Snapshot 306S can include a file listing of directory 306, information about the files in directory 306, and a hash of the contents of each file in directory 306. Snapshot 306S can be a snapshot that was saved after a previous update of directories 305 and 306.

Method 400 includes an act of referring to a second saved snapshot of the second directory (act 403). The second saved snapshot of the second directory having been saved prior to receiving the indication that the first and second directories are to be updated. The second saved snapshot of the second directory storing at least a list of files included in the second directory after the previous update. For example, categorization module 342 can access snapshot 305S. Snapshot 305S can be a snapshot of directory 305 (e.g., directory historical data) that was saved prior to receiving selected mode 361. Snapshot 305S can include a file listing of directory 305, information about the files in directory 305, and a hash of the contents of each file in directory 305. Snapshot 305S can be a snapshot that was saved after a previous update of directories 305 and 306.

Method 400 includes an act of comparing the current contents of the first directory to the first saved snapshot (act 404). For example, categorization module 342 can compare the current contents of directory 306 to snapshot 306S. Comparing the current contents of directory 306 to snapshot 306S can include determining if the current contents of directory 306 include a file not included in snapshot 306S and determining if snapshot 306S includes a file not included in the current contents of directory 306. For example, categorization module can compare file 315 and file 326 to snapshot 306S to determine if snapshot 306S includes file 315 and/or file 326. Categorization module can also compare snapshot 306S to the current contents of directory 306 to determine if snapshot 306S includes other files that are not in the current contents of directory 306.

Comparing the current contents of directory 306 to snapshot 306S can also include determining if file attributes for a file in the current contents of directory 306 differ from corresponding file attributes in snapshot 306S. For example, if files 315 and 316 exist in snapshot 306S, categorization module 342 can compare attributes 365 and 376 to corresponding attributes in snapshot 306S. Comparing the current contents of directory 306 to snapshot 306S can also include determining if the previous contents of a file and the current contents of a file are the same. For example, categorization module 342 can generate a hash (e.g., SHA-1) of the current contents of a file in directory 306. Categorization module 342 can then compare the generated hash to a corresponding hash for the file contained in snapshot 306S.

Method 400 includes an act of comparing the current contents of the second directory to the second saved snapshot (act 405). For example, categorization module 342 can compare the current contents of directory 305 to snapshot 305S. Comparing the current contents of directory 305 to snapshot 305S can include determining if the current contents of directory 305 include a file not included in snapshot 305S and determining if snapshot 305S includes a file not included in the current contents of directory 305. For example, categorization module can compare file 315 and file 325 to snapshot 305S to determine if snapshot 305S includes file 315 and/or file 325. Categorization module can also compare snapshot 305S to the current contents of directory 305 to determine if snapshot 305S includes other files that are not in the current contents of directory 305.

Comparing the current contents of directory 305 to snapshot 305A can also include determining if file attributes for a file in the current contents of directory 305 differ from corresponding file attributes in snapshot 305S. For example, if files 315 and 316 exist in snapshot 305S, categorization module 342 can compare attributes 365 and 375 to corresponding attributes in snapshot 305S. Comparing the current contents of directory 305 to snapshot 305S can also include determining if the previous contents of a file and the current contents of a file are the same. For example, categorization module 342 can generate a hash (e.g., SHA-1) of the current contents of a file in directory 305. Categorization module 342 can then compare the generated hash to a corresponding hash for the file contained in snapshot 305S.

Method 400 includes an act of categorizing the contents of the first and second directories into one or more categories based on the results of the comparisons (act 406). For example, categorization module 342 can categorize files listed in snapshots 306S and 305S (the previous contents of directories 306 and 305 respectively) and files in the current contents of directories 306 and 305 into one or more categories of categorized files 380. Categorizing a file can include identifying specified criteria in a set of criteria the file satisfies. A set of criteria can include criteria indicative of existence in a directory, date of creation, file name, etc. Based on which criteria a file satisfies, the file can be placed in an appropriate category.

For example, file 315 can be included in category 381 (exists in directory 305 and directory 306), file 325 can be included in category 382 (exists in directory 305, does not exist in directory 306), and file 326 can be included in category 383 (exists in directory 306, does not exist in directory 305). A vertical ellipsis within a category represents that one or more additional files can also be included in the category.

A series of two periods (an ellipsis) represents that additional categories can be included before, between, and after the expressly depicted categories in categorized files 380. Thus, other files from directories 305 and 306 can be included in the express depicted categories as well as any of these additional categories.

Method 400 includes an act of identifying one or more file operations to perform on each of the categorized files based on the user-selected update mode (act 407). For example, directory update module 380 can identify one or more file operations from file system operations 303 to perform on each file in categorized files 380 based on selected mode 361. Based on the user-selected update mode different file operations (type and quantity) can be identified. For example, different and more file system operations may be identified when the user-selected update mode is synchronize than are identified when the user-selected update mode is contribute (since deletes are not repeated).

Directory update module 301 can identify file operations on a per category basis, for example, identifying file operations that are to be performed on files in the same category. For example, the same file operations from 303 can be identified for file 326 as well as any other files in category 383. Directory update module can also identify other file operations, such as, for example, rename, move, create, modify, etc., on a per file basis.

Directory module 301 can also identify file operations on a per category basis. That is, directory update module 301 can identify similar (or even the same) file operations to perform on files in the same category. For example, directory update module 301 may identify that all files in category 383 are to be deleted from directory 306. Alternately, directory update module 301 may identify that all files in category 383 are to be copied to directory 305. Directory update module can also identify other file operations, such as, for example, rename, move, create, modify, etc. on a per category basis.

Method 400 includes an act of performing the identified file system operations on the categorized files to update the first and second directories in accordance with the user-selected update mode (act 408). For example, directory update module 301 can perform identified file system operations from file system operations 303 (e.g., op 313, op 323, etc) on categorized files 380 to update directories 305 and 306 in accordance with selected mode 361. Performing identified file system operations can include sending an update to each directory. For example, directory update module 310 can send update 335 to directory 305 and can send update 335 to directory 336.

Each update can indicate one or more file operations that are to be performed on the directory. For example, update 335 indicates that op 313 is to be performed on file 315. Similarly, update 336 indicates that op 323 is to be performed on file 326. Performed file system operations can include copying and/or moving files between directories 305 and 306, deleting files including in directories 305 and 306, renaming files included in directories 305 and 306, etc. Performing file system operations can also include modifying file attributes.

After directories 305 and 306 are updated, directory update module 301 can take new snapshots of the contents of directories 305 and 306. For example, directory update module 301 can take new snapshot 305N of directory 305 and new snapshot 306N of directory 306. New snapshots can be used to replace, update, overwrite, etc., existing snapshots. For example, new snapshot 305N can replace snapshot 305S and new snapshot 306N can replace snapshot 306S. The new snapshots can be used to facilitate a subsequent update to directories 305 and 306.

Embodiments of the present invention can be used to more efficiently propagate the renaming of files. For example, directory update module 301 can be configured to compare file attributes from different files in different directories to one another. Based at least in part on the comparison, directory update module 301 can match files or images that have different names but that are otherwise the same (e.g., attributes, except for file name, are very similar or the same). Directory update module 301 can rename the older file with the name of the newer file. For example, it may be that the same file is on a desktop computer and a laptop computer and that the file is subsequently renamed on the laptop computer. During a directory update, directory update module 301 can match the files (based on file attributes) and rename the file on the desktop computer system to the name used on the laptop computer. Synchronize module 101 can also be configured to include similar renaming functionality.

Directory update module 301 can also be configured to generate a preview for presentation to a user. For example, before actually implementing one or more file operations to update directories 305 and 306 in accordance with user-selected mode 361, directory update module 301 can send preview 391 to user interface 302. User interface 302 can present preview 391 at an output device, such as, for example, a computer monitor. Preview 391 can list file operations that have been selected to update directories 305 and 306 in accordance with user-selected mode 361. Through user interface 302, a user can manipulate selected file operations to add, remove, and/or modify file operations that are to be performed. For example, a user can deselect one or more file operations that are not to be performed. Synchronize module 101 can also be configured to include similar preview functionality.

A user-selected update mode for a pair of directories can be stored and reused for later directory updates. For example, selected mode 361 can be retained and reused for subsequent directory updates of directories 305 and 306. Thus, a user may be relieved from having to select or re-select an appropriate update mode each time a directory update is performed.

Embodiments of the present invention can facilitate more accurate directory updates based on directory historical information, such as, for example, snapshots. Embodiments of the present invention can also facilitate directory updates based on user input, such as, for example, user-selected update modes and user input to directory update previews. Accordingly, more accurate directory updates performed in accordance with the desires of a user are possible.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for synchronizing the contents of a pair of file system directories within a file system, the method comprising:
    an act of synchronizing a first file system directory and a second file system directory with one another through a prior synchronization, the prior synchronization altering the contents of at least one the first file system directory and the second file directory;
    an act of accessing stored directory historical data for the first and second file system directories, the stored historical directory data storing the contents of the first file system directory and the second file system directory;
    an act of updating the directory historical data for the first and second file system directories to store the altered contents as prior contents of the first file system directory and the second file system directory resulting from prior synchronization of the first file system directory and the second file system directory;
    an act of receiving one or more user-entered file system operations indications a user intent to change one or more of: the contents of the first file system director in a specified manner and the contents of the second file system directory in a specified manner;
    an act of applying the user-entered file operations at the first file system to implement user intent subsequent to the prior synchronization, the one or more user-entered file system operations changing the contents of one or more of the first file system director and the second file directory in the specified manner
    an act of receiving an indication that the first file system directory and the second file system directory are to again be synchronized through a next synchronization subsequent to applying the user-entered file system operations to implement the user intent;
    an act of determining that the contents of the first and second file system directories, after application of the one or more user-entered file system operations, contain insufficient information for the next synchronization to insure that the user intent, indicated in the one or more user-entered file system operations, is appropriately represented in the first and second file system directories as a result of the next synchronization;
    an act of referring to the directory historical data for the first and second file system directories to obtain further information for the next synchronization in response to the determination that the contents of the first and second file system directories contain insufficient information, the further information including the prior contents of the first file system directory and the second file system directory resulting from the prior synchronization of the first file system directory and the second file system directory; and
    an act of performing the next synchronization based on the contents of the first and second file system directories and the further information obtained from the directory historical data for the first and second file system directories, the results of the next synchronization appropriately representing the user intent, indicated in the one or more user-entered file system operations, within the first and second file system directories, including:
    an act of comparing the contents of the first file system directory to the contents of the second file system directory to identify current differences between the current contents of the first file system directory and the current contents of the second file system directory;
    an act of comparing the prior contents of the first and second file system directories to the current contents of the first and second file system directories respectively, including comparing the current contents of the first file system directory to the prior contents of the second file system directory and comparing the current contents of the second file system directory to the prior contents of the first file system directory, to identify other differences between the prior contents of the first and second file system directories and the current contents of the first and second file system directories respectively; and
    an act of utilizing the identified current differences along with the identified other differences to implement the next synchronization for the first and second directories directly with one another, the identified current differences along with the identified other differences being utilized to appropriately represent the user intent within the resulting contents of the first and second file system directories.

2. The method as recited in claim 1, wherein the act of receiving an indication that a first directory and a second directory are to again be synchronized comprises an act of receiving user input.

3. The method as recited in claim 1, wherein the act of receiving an indication that a first directory and a second directory are to again be synchronized comprises an act of receiving a indication from a scheduling module that maintains a schedule of when directories are to be synchronized.

4. The method as recited in claim 1, wherein the act of referring to directory historical data for the first and second directories comprises act of referring to directory images listing the prior contents of the first and second directories.

5. The method as recited in claim 1, wherein the act of comparing the prior contents of the first and second directories to the current contents of the first and second directories respectively to identify other differences comprises an act of comparing a list of the previous contents of the first and second directories to the current contents of the first and second directories respectively.

6. The method as recited in claim 1, wherein the act of utilizing the identified current differences along with the identified other differences to synchronize the first and second directories comprises an act of utilizing the differences to identify file system operations that are to be performed on the first and second directories to implement the user intent indicated in the one or more user-entered file system operations.

7. At a computer system, a method for updating the contents of a pair of file system directories, the method comprising:
   an act of receiving an indication that a first file system directory and a second file system directory are to be updated in accordance with a user-selected directory update mode selected from among a plurality of different directory update modes, the user-selected directory update mode providing rules on how to apply any available information to update the first file system directory and a second file system directory with one another based on a user desire to update the first and second files system directories, based on snapshots, in one of a variety of different user-selectable ways;
   an act of referring to a first saved snapshot of the files in the first system directory, the first saved snapshot of the first file system directory saved in response to a previous update of the first and second file system directories and prior to receiving the indication that the first and second file system directories are to be updated, the first saved snapshot of the first file system directory storing a list of the prior files of the first file system directory, including at least one file system attribute for each file in the first file system directory, resulting from the previous update of the first and second file system directories;
   an act of referring to a second saved snapshot of the files in the second file system directory, the second saved snapshot of the second file system directory saved in response to the previous update of the first and second file system directories and prior to receiving the indication that the first and second file system directories are to be updated, the second saved snapshot of the second file system directory storing a list of the prior files of the second directory, including at least one file system attribute for each file in the second file system directory, resulting from the previous update of the first and second directories;
   an act of comparing the current files in the first file system directory including at least one file system attribute for each file in the second file system directory, to the stored list of the prior files in the first file system directory, including at least one file system attribute for each file in the second file system directory, stored in the first saved snapshot;
   an act of comparing the current files in the second file system directory, including at least one file system attribute for each file in the second file system directory to the stored list of the prior files in the second file system directory, including at least one file system attribute for each file in the second file system directory, stored in the second saved snapshot;
   an act of comparing the current contents of the first file system directory to the prior contents of the second file system directory;
   an act of comparing the current contents of the second file system directory to the prior contents of the first file system directory;
   in accordance with the provided rules:
   an act of categorizing the files in the first and second file system directories into one or more categories based on the results of the comparisons;
   an act of identifying one or more file system operations to perform on each of the categorized files based on the user-selected update mode; and
   an act of performing the identified file system operations on the categorized files to update the first and second file system directories, including updating a file system attribute for one or more files.

8. The method as recited in claim 7, wherein the act of receiving an indication that a first file system directory and a second file system directory are to be updated in accordance with a user-selected directory update mode comprises an act of receiving an indication of a user-selected update mode from a user interface.

9. The method as recited in claim 7, wherein the act of receiving an indication of an user-selected update mode from a user interface comprises an act of receiving an indication of an user-selected update mode selected from among, echo mode, a subscribe mode, a contribute mode, and a combine mode.

10. The method as recited in claim 7, wherein the act of referring to the first saved snapshot comprises an act of referring to a snapshot that lists each file in the first file system directory resulting from a prior synchronization of the first and second file system directories and includes a plurality of file system attributes for each file in the first file system directory.

11. The method as recited in claim 10, wherein the act of referring to the second saved snapshot comprises an act of referring to a snapshot that lists each file in the second file system directory resulting from a prior synchronization of the first and second file system directories and includes a plurality of file system attributes for each file in the second file system directory.

12. The method as recited in claim 7, wherein the act of comparing the current files in the first file system directory to the stored list of the prior files in the first file system directory stored in the first saved snapshot comprises an act of determining if a file in the stored list of the prior files in the first directory is also included in the current files in the first file system directory.

13. The method as recited in claim 7, wherein the act of comparing the current files in the first file system directory to the stored list of the prior files in the first file system directory stored in the first saved snapshot comprises an act of determining if a file's attributes contained in the stored list of the prior files in first file system directory differ from the file's attributes in the current files in the first file system directory.

14. The method as recited in claim 13, wherein the act of determining if a file's attributes contained in the stored list of the prior files in the first file system directory differ from the file's attributes in the current files in the first file system directory comprises determining if the file's name has changed.

15. The method as recited in claim 7, wherein the act of comparing the current files in the first file system directory to the stored list of the prior files in the first file system directory stored in the first saved snapshot comprises an act of determining if a file's contents represented in the first saved snapshot differ from the file's contents currently in the first file system directory.

16. The method as recited in claim 7, wherein the act of identifying one or more file system operations to perform on each of the categorized files based on the user-selected update mode comprises an act of identifying one or more file system operations to perform on each file on a per file basis.

17. The method as recited in claim 7, wherein the act of identifying one or more file system operations to perform on each of the categorized files based on the user-selected update mode comprises an act of identifying one or more file system operations to perform on each file on a per category basis.

18. The method as recited in claim 7, wherein the act of identifying one or more file system operations to perform on each of the categorized files based on the user-selected update mode comprises an act of identifying one or more file system operations selected from among file copy, file delete, and file rename.

19. The method as recited in claim 7, wherein the act of performing the identified file system operations on the categorized files to update the first and second file system directories comprises an act of performing one or more of a file copy, file delete, and file rename.

20. The method as recited in claim 7, further comprising:
an act of saving a new snapshot of the first file system directory subsequent to performing the identified file system operations, the new snapshot of the first file system directory at least listing the files in the first directory that resulted from completing the user-selected directory update mode; and
an act of saving a new snapshot of the second file system directory subsequent to performing the identified file system operations, the new snapshot of the second file system directory at least listing the files in the second directory that resulted from completing the user-selected directory update mode.

21. A computer program product for use at a computer system, the computer program product for implementing a method for updating the contents of a pair of directories, the computer program product comprising one or more storage media having stored thereon computer-executable instructions that, when executed by a processor, cause the computer system to perform the following:
receive an indication that a first file system directory and a second file system directory are to be updated in accordance with a user-selected directory update mode selected from among a plurality of different directory update modes, the user-selected directory update mode providing rules on how to apply any available information to update the first file system directory and a second file system directory with one another based on a user desire to update the first and second files system directories, based on snapshots, in one of a variety of different user-selectable ways;
refer to a first saved snapshot of the files in the first system directory, the first saved snapshot of the first file system directory saved in response to a previous update of the first and second file system directories and prior to receiving the indication that the first and second file system directories are to be updated, the first saved snapshot of the first file system directory storing a list of the prior files of the first file system directory, including at least one file system attribute for each file in the first file system directory, resulting from the previous update of the first and second file system directories;
refer to a second saved snapshot of the files in the second file system directory, the second saved snapshot of the second file system directory saved in response to the previous update of the first and second file system directories and prior to receiving the indication that the first and second file system directories are to be updated, the second saved snapshot of the second file system directory storing a list of the prior files of the second directory, including at least one file system attribute for each file in the second file system directory, resulting from the previous update of the first and second directories;
compare the current files in the first file system directory including at least one file system attribute for each file in the second file system directory, to the stored list of the prior files in the first file system directory, including at least one file system attribute for each file in the second file system directory, stored in the first saved snapshot;
compare the current files in the second file system directory, including at least one file system attribute for each file in the second file system directory to the stored list of the prior files in the second file system directory, including at least one file system attribute for each file in the second file system directory, stored in the second saved snapshot;
compare the current contents of the first file system directory to the prior contents of the second file system directory;
compare the current contents of the second file system directory to the prior contents of the first file system directory;
in accordance with the provided rules:
categorize the files in the first and second file system directories into one or more categories based on the results of the comparisons;
identify one or more file system operations to perform on each of the categorized files based on the user-selected update mode; and
perform the identified file system operations on the categorized files to update the first and second file system directories, including updating a file system attribute for one or more files.

* * * * *